Jan. 22, 1963    E. C. BOPF    3,074,552
COTTON RECEPTACLE
Filed July 15, 1960
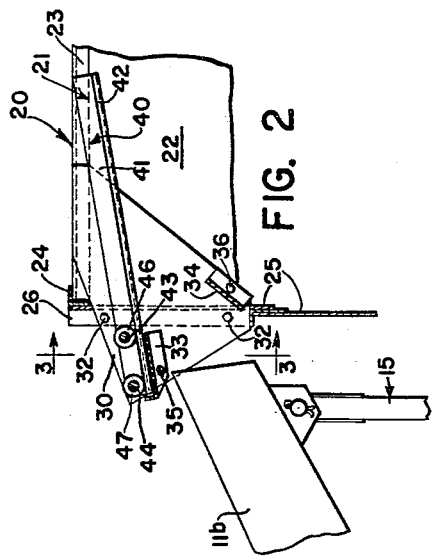
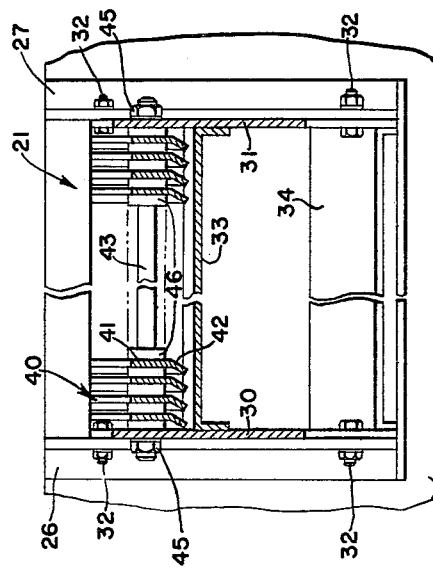
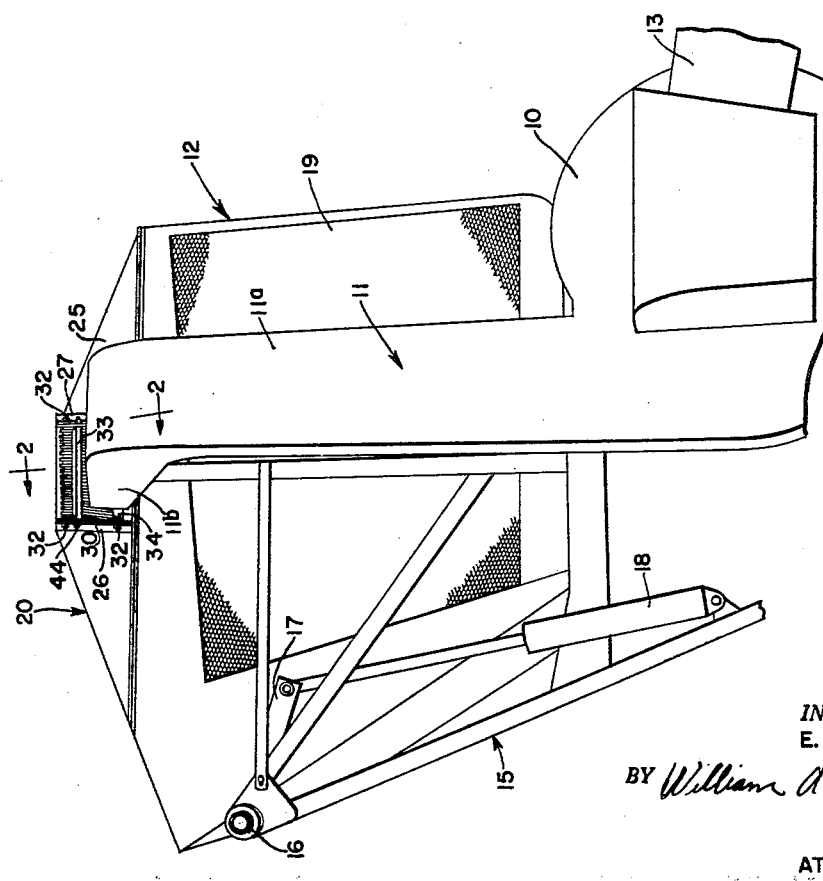
INVENTOR.
E. C. BOPF
BY William A. Murray
ATTORNEY

United States Patent Office 3,074,552
Patented Jan. 22, 1963

3,074,552
COTTON RECEPTACLE
Edward C. Bopf, Des Moines, Iowa, assignor to Deere & Company, Moline, Ill., a corporation of Delaware
Filed July 15, 1960, Ser. No. 43,051
3 Claims. (Cl. 209—250)

This invention relates to a receptacle normally mounted on a cotton picker which receives and transports harvested cotton. Still more particularly this invention relates to an improved type of lid on the receptacle which operates in conjunction with the means of conveying the cotton into the receptacle to improve the quality of the cotton by providing an improved cleaning device therein.

In the conventional type of receptacle used in conjunction with a cotton harvester, there is provided a large cotton carrying basket or receptacle normally supported on the frame of the harvester which ultimately receives and carries the cotton. The cotton is conveyed to the basket or receptacle by means of a pneumatic cotton conveying system including a duct having an outlet for discharging a stream of material including picked cotton and incidental trash collected in the harvesting operation through a material intake opening in one side and generally at the top of the receptacle. In most instances the stream of material being discharged from the conduit is directed upwardly and impinges against a grille structure in the lid of the basket or receptacle, the purpose being, at least in theory, to permit the accumulated trash with the cotton to pass through the grille while the cotton is deflected into the receptacle.

There are certain problems which arise in providing a grille which traverses the stream of cotton and trash. The primary problem is in maintaining the grille open sufficiently to pass the trash and air while retaining the cotton. Inherently, cotton, upon striking a rough edge or abutment in a grille, will have a tendency to build up and to block the openings in the grille. Once the build-up starts, it rapidly spreads until the entire grille is closed. To overcome this problem, it is common to provide grille elements disposed parallel to one another and generally inclined relative to the stream so that the cotton which contacts the grille elements will slide off the ends and deflect into the receptacle while the trash passes through the spaces between the grille elements. This has met with a certain degree of success, but does not completely eliminate the problem. Heretofore, the grille elements have normally been supported at opposite ends and any type of attachments between the ends and receptacle creates an abutment on which the cotton can begin to build up. Also, the grille elements themselves have a thickness dimension which provides an abutment which the cotton can contact and slowly build up.

With the above in mind, it is the purpose of the present invention to provide a new and novel design for a grille structure which is positioned to traverse the cotton stream. It is proposed to provide a series of sheet metal strips disposed on edge and supported in cantilever fashion on the receptacle above and adjacent the opening in which the cotton is received. The sheet metal strips extend in the direction of the stream and are slightly inclined to traverse the stream and to deflect the cotton into the receptacle while permitting the trash and air to pass. The sheet metal strips are spaced apart to provide relatively wide spaces between the strips and are corrugated or flanged longitudinally whereby there will be flanges or abutments extending generally across the spaces between the strips which prevents the cotton from passing through the spaces. Each of the strips are identical and consequently the spacing permitting minute trash and air to pass is not reduced. The corrugations or flanges will also effect rigidity in the strips so that the free ends will be held generally in a rigid position. Upon the cotton impinging against the edges of the metal strips, the edges themselves offer very little resistance to the cotton and consequently the cotton will be readily passed along the edges until deflected into the receptacle.

Other objects and advantages of the present invention will become apparent to those skilled in the art as the nature of the invention is better understood from the following description and as shown in the accompanying drawings.

FIG. 1 is a front view of a portion of a cotton harvester and a cotton receptacle incorporating the principles of the present invention.

FIG. 2 is a vertical longitudinal sectional view through the upper end of the conduit and through the grille structure.

FIG. 3 is an enlarged sectional view taken substantially along the line 3—3 of FIG. 2.

Referring first to FIG. 1, there is therein provided a blower mechanism, indicated in its entirety by the reference numeral 10, and having a rectangularly-shaped discharge duct 11, the latter having a vertical portion 11a and a terminal rearwardly extending portion 11b extending slightly upwardly for discharging material into a cotton receptacle 12. A suction duct, shown only partially at 13, leads from the cotton harvesting mechanism, not shown, into the blower mechanism 10. The blower mechanism 10 as well as the ducts 11, 13 are conventional on cotton harvesters and are shown and described only generally and for purposes of orientation.

The receptacle 12 is supported on main framework 15 and more specifically on a fore-and-aft extending pivot shaft 16 which is disposed horizontally fore and aft so that the basket may pivot relative to the axis of the shaft for purposes of side discharge. Fixed to the basket 12 is an arm 17 having its outer end connected to an upwardly projecting hydraulic cylinder 18, the lower end of which is fixed to the framework 15. The cylinder 18 operates to swing the basket about the fore-and-aft extending horizontal axis of the pivot shaft 16 and operates to swing the basket over the shaft 16 for purposes of unloading the basket or receptacle 12. As is conventional, the receptacle 12 is composed of a lower basket-like structure having a floor and open meshed sides which generally collects the cotton and an upper lid or hood 20 which closes the basket 19 from the top and may be opened for purposes of discharging material or cotton from the basket. As previously indicated, the basket 12 is of conventional construction and is here shown and described for purposes of orientation so that the present invention, presently to be described, may be fully appreciated in its manner of operation.

The hood 20 is composed of a grille structure 21 centrally located and in fore-and-aft alinement with the discharge end 11b of the discharge duct 11. The hood is further composed of inclined panels extending downwardly from upper edges adjacent the grille 21 to opposite sides of the discharge basket. One of the top panels is indicated at 22 in FIG. 2. Suitable angle iron structure, such as at 23, 24, is provided in the cover or lid 20 to serve as the main frame for the cover. A front wall 25 is provided in the cover 20 and has a central opening, in alinement with the central grille structure 21 and the discharge end 11b of the duct 11, through which cotton bolls may pass into the receptacle 12. Fixed to opposite edges of the central opening are a pair of upright angle irons 26, 27.

A pair of upright fore-and-aft extending side panels or plates 30, 31 are bolted, as at 32, to the flanges of the angle irons 26, 27. The side panels 30, 31 are interconnected by a pair of laterally disposed panels or plates 33, 34 disposed above and below the stream of material passing from the discharge end 11b of the duct. The transverse laterally disposed panels 33, 34 are connected to the side panels 30, 31 by means of bolts 35, 36 respectively extending through vertical end flanges on the panels 33, 34 and the respective side panels. It should be noted relative to FIG. 2 that the lower laterally disposed panel 34 is disposed beneath the discharge end 11b so that should trash or heavier material than the relatively light cotton bolls pass through the duct 11, they will, through their gravitational effect, tend to drop onto the surface of the panel 34 and out the forward opening.

The forward section of the grille structure 21 is composed of a series of fore-and-aft extending grid or grille elements 40. Each grid element is composed of an elongated sheet metal strip disposed on edge so as to have a main vertically disposed section 41 and a lower edge flange 42 extending to one side of the main section 41. In the preferred form of the invention, as shown, the grid element 40 has its lower edge 42 flanged. However, any other type of corrugation would operate in somewhat the same manner so long as there was a portion of the grid element formed to one side of the plane of the vertical section 41.

The grid elements 40 are supported on the side panels 30, 31 by means of transverse rods 43, 44 extending between the panels 30, 31 and threaded to opposite ends to receive nuts 45. The grid elements 40 are provided with transversely alined openings for receiving the rods 43, 44. Also mounted on the rods 43, 44 are spacer rings 46, 47 respectively, each ring being positioned between adjacent grid elements 40. Referring to FIG. 2, it becomes apparent that the rods 43, 44 are positioned above the laterally disposed panel 33 and the panel 33 operates to prevent cotton from impinging against the rods 43, 44. The purpose of so placing the panel 33 is to prevent a build-up of cotton against the rods 43, 44 and the adjacent spacer rings 46, 47. Also, it becomes apparent that the grid elements 40 are mounted only at their forward ends and generally in cantilever fashion so that their rear ends are free. The grid elements are also supported so that they extend in the direction of movement of the cotton being discharged from the discharge end 11b but nevertheless slightly inclined to the stream of discharging cotton so that the grid elements 40 in effect traverse the stream of cotton.

The grid elements operate in conventional manner but also in superior manner to heretofore conventional type grille structure. It will be noted that the spacer rings 46, 47 are considerably wider than the sheet metal strips or grid elements 40. Consequently, there is considerably more opening between the grid elements 40 than area occupied by the grid elements. This permits a maximum amount of air and trash to pass between the grid elements 40. However, the lower flanges 42 of the grid elements will prevent the cotton bolls from passing between the grid elements. Also, the flanges 42 will effect rigidity in what would otherwise be flexible grid elements. The overall effect is, therefore, to provide only a narrow or thin edge for the cotton to impinge against as it leaves the discharge conduit 11. As a result, there will be little or no buildup of cotton on the grille structure 21.

While only one form of the invention has been shown it should be recognized that other forms and variations will occur to those skilled in the art. Therefore, while the present form is shown and described in detail for the purpose of clearly and concisely illustrating the principles of the invention, it is not the intention to limit or narrow the invention beyond the broad concepts set forth in the appended claims.

What is claimed is:

1. In a receptacle for a cotton picker having a pneumatic cotton conveying system including a conduit provided with an outlet for discharging a stream of material including picked cotton and incidental trash through a material intake opening in one side of the receptacle, the improvement comprising: an overhead wall on the receptacle composed of a plurality of elongated parallel and spaced apart grid elements mounted in cantilever fashion at one end of the receptacle adjacent the opening and above the stream and extending in the direction of movement of the materials to free ends, said grid elements being inclined relative to and traversing the stream of material whereby the material will impinge against the grid elements, the cotton will slide off the free ends of the elements for collection in the receptacle, and the trash will pass through the openings between the elements, each of said grid elements being elongated sheet metal strips disposed on edge with the lower portion thereof flanged to one side to effect rigidity in the strips.

2. In a receptacle for a cotton picker having a pneumatic cotton conveying system including a conduit provided with an outlet for discharging a stream of material including picked cotton and incidental trash through a material intake opening in one side of the receptacle, the improvement comprising: an overhead wall on the receptacle composed of a plurality of elongated parallel and spaced apart grid elements each of said grid elements being elongated sheet metal strips disposed on edge with the lower portion thereof flanged to one side to effect rigidity in the strips; means mounting the grid elements on the receptacle in cantilever fashion above the opening with the free ends thereof projecting downstream and inclined in traversing relation to the stream whereby the material discharging from the conduit will contact the grid elements, the cotton will deflect into the receptacle, and the trash will move between the grid elements.

3. The invention defined in claim 2 in which the strips are supported in cantilever fashion at one end by means of a rod extending through the respective ends of the individual strips and spacers on the rod between the strips for maintaining the proper spacing between the strips, said rod being detachably mounted on the receptacle.

References Cited in the file of this patent
UNITED STATES PATENTS

| | | |
|---|---|---|
| 1,003,884 | Davis | Sept. 19, 1911 |
| 1,254,868 | Wallace | Jan. 29, 1918 |
| 1,820,055 | Divoky | Aug. 25, 1931 |
| 2,772,445 | Hubbard | Dec. 4, 1956 |
| 2,825,934 | Sawyer | Mar. 11, 1958 |

FOREIGN PATENTS

| | | |
|---|---|---|
| 12,297 | Great Britain | May 26, 1906 |